United States Patent Office 2,822,341
Patented Feb. 4, 1958

2,822,341

FREEZE-RESISTANT POLYMER-CONTAINING LATEX PAINT

Verle A. Miller, Dover, Del., and Robert L. Bebb, Akron, and John H. Musch, Silver Lake, Ohio, assignors to The Firestone Tire & Rubber Company, Akron, Ohio, a corporation of Ohio No Drawing. Application July 10, 1953
Serial No. 367,346

6 Claims. (Cl. 260—23)

This invention relates to water paints and more particularly to water paints containing an aqueous polymer dispersion.

Desirable water paints have recently been proposed having paint pigments dispersed in a synthetic polymer latex. By "latex" and "dispersion" is meant an aqueous collodial suspension or emulsion, the dispersed particles of which possess an average diameter in the range of about ten milli-microns to one micron.

Synthetic polymer latices, suitable for paints of the above type, include those produced by aqueous polymerization of a polymerizable ethylenic compound either with itself or with one or more different polymerizable ethylenic compounds. Polymerizable ethylenic compounds include the conjugated dienes and the monoethylenically unsaturated compounds such as the vinyl aromatic compounds, the alpha methylene carboxylic acids and esters, nitriles, aldehydes, ketones, and amides thereof, the vinyl aliphatic compounds, the vinylidene compounds, the methylene hydrocarbons and the like. Suitable dienes are butadiene-1,3, isoprene, 2,3-dimethyl butadiene-1,3- piperylene, 2-chlorobutadiene-1,3, 2,3-dichlorobutadiene-1,3, 2-bromobutadiene-1,3, 2-fluorobutadiene-1,3, 2,3-difluorobutadiene-1,3, and the like. Suitable vinyl aromatic compounds are styrene, vinyl toluene, divinyl benzene, the nuclearly substituted styrenes such as the chloro-styrenes and alkyl styrenes, alpha-chlorostyrene, alpha-methylstyrene, vinyl naphthalene, vinyl pyridine, vinyl carbazole and the like. Examples of various of the alpha methylene compounds are acrylic acid, acrylamide, methyl acrylate, methyl methacrylate, methacrylic acid, methacrylamide, acrolein, acrylonitrile, methacrylonitrile and the like. Vinyl aliphatic compounds include vinyl chloride, vinyl bromide, vinyl fluoride, vinyl acetate, vinyl propionate, vinyl formate, vinyl methyl ether, vinyl ethyl ether, divinyl methyl ketone, vinyl ethyl ketone, vinyl isobutyl ketone, divinyl ketone, vinyl ethyl sulfone, the vinyl thioethers, and the like. Suitable vinylidene compounds are vinylidene fluoride, 1-chloro-1-fluoro-ethene, vinylidene cyanide, and the like. Representative of the alpha methylene hydrocarbons are isobutene, ethylene and propylene. Polymerizable halo-ethylenes, such as chloro-trifluoroethylene, are also suitable monomers. Although homopolymers, either rubbery or resinous, are suitable, many of the more desirable synthetic polymers for water paints are copolymers of a minor proportion of a conjugated diene and a major proportion of a monoethylenically unsaturated compound. "Copolymer" is meant to include terpolymers and other interpolymers.

A major deterrent in the universal acceptability of polymer-containing paints of the general type discussed above devolves from the susceptibility of such paints to coagulation when the paints are subjected to freezing conditions. A coagulated polymer-containing paint is solid and no longer usable as a paint. Since many geographical localities commonly experience freezing temperatures during a substantial portion of the year, special precautions must be taken in handling, storing or shipping these paints to prevent subjecting the paints to freezing conditions. Such precautions are both cumbersome and expensive.

An object, therefore, of the present invention is to provide a polymer-containing aqueous paint of the above general type which can be subjected to freezing conditions without coagulation. Another object is to provide a method of producing an essentially freeze-stable aqueous synthetic polymer-containing paint.

The above and further objects are obtained in accordance with the invention by polymerizing one or more polymerizable ethylenic compounds in an aqueous emulsion in the presence of a water soluble salt of persulfuric acid and a particular non-ionic emulsifying agent. Suitable water soluble salts of persulfuric acid include alkali metal persulfates, such as sodium, potassium, lithium, and like persulfates, and ammonium persulfate. For economic reasons potassium persulfate is preferred. The particular non-ionic emulsifying agent is a soap-modified glyceryl monoricinoleate and is available commercially under the trade designation GMR-S.[1] If desired, the polymerization mixture can also include conventional polymerization modifiers, buffers, cross-linking agents and the like.

It is known to utilize as polymerization catalysts various persulfates over a relatively large range of quantities in emulsion polymerization, e. g., from about 0.1 to 5.0 parts by weight per 100 parts of monomer. In the practice of the invention, however, it is important that unless at least a certain minimum quantity of persulfate is used it is impossible to obtain a polymer latex which will produce a freeze-stable paint. As can be seen from certain of the examples hereafter, a paint possessing some stability under freezing conditions can be produced from a polymer latex resulting from polymerization in the presence of as little as 0.5 part by weight of persulfate per 100 parts by weight of monomer. It is, however, desirable that the persulfate catalyst be used in an amount of at least about 1.0 part by weight per 100 parts by weight of monomer, since a greater freeze-stability is obtained thereby.

The soap-modified glyceryl monoricinoleate is preferably included in the initial polymerization charge since faster conversion rates and more desirable results are thus obtained. It can, however, be injected into the reactor after the initial stages of polymerization. As little as 0.5 and as much as 5.0 parts by weight of the glyceryl monoricinoleate have been found to give desirable results in accordance with the invention. Preferably, however, polymerization is effected in the presence of from about 1.0 to about 3.0 parts by weight of the emulsifying agent per 100 parts of monomer.

While some freeze-resistance is obtained without stabilizing the polymer latex other than by the relatively small amount of emulsifier initially charged into the polymerization reactor, more freeze resistant paints are obtained by further stabilizing the polymer latex by addition of anionic or additional nonionic or mixtures of anionic and nonionic emulsifiers to the latex after about 50% polymerization conversion. This additional stabilizing of the latex can, if desired, be entirely or partially effected after polymerization has been completed.

The polymer latices can be mixed with most of the common paint pigments to produce a paint or coating

[1] Supplied by Glyco Products Company, Inc. The emulsifier is a yellow, water dispersible liquid having a specific gravity of 1.01, an acid value of <4 and a saponification value of 125–135. The emulsifier is produced by reacting one mole of glycerol with one mole of ricinoleic acid to form a mono ester. The emulsifier is "soap-modified" by carrying out the above reaction in the presence of a small amount (sufficient to produce intrinsically about 3 to 8% potassium ricinoleate in the final product) of potassium hydroxide.

composition of the water dispersion type, which dries to form an opaque film. The pigments can be added to the latex if sufficient precautions, known to the art of compounding natural or synthetic rubber latex, are taken to avoid coagulating the latex. It is preferred to form a water dispersion of the pigments first and then to mix this dispersion carefully with the latex.

Most paint pigments are hydrophobic and require the presence of a dispersing agent for the production of a water dispersion of the pigments suitable for mixing with the latex. Many of the dispersing agents known to the colloid art can be utilized, including the various water soluble soaps, the aliphatic or aromatic sulfonates, the sulfolignins, the aliphatic sulfates, and other anionic emulsifying agents on the market; various polyethers, ether-alcohol condensates and other nonionic emulsifying agents; and the various hydrophilic colloidal dispersing agents, including casein, soya bean protein and other animal and vegetable proteins (including albumens) capable of reacting with an alkaline material to become dispersible in water, cellulose ethers, such as methyl cellulose, and other water dispersible cellulose derivatives, as well as other hydrophilic colloids well known in the colloid art. Two or more dispersing agents can advantageously be used in a single paint.

Typical paint pigments which are successfully incorporated with the polymer latex into a paint include titanium dioxide (the anatase or rutile grade is satisfactory), clay, silica, lithopone, mica, barium sulfate, talc and zinc sulfide. Many dyes and colored pigments may be included in the pigment formulation, including carbon black, iron oxides, cadmium yellows, phthalocyanines, ultra-marine, chromium oxides, umber and sienna.

An example of a satisfactory paint of the flat interior type is a white paint utilizing casein as the pigment dispersing agent. It is well known in the paint industry that casein can be readily made dispersible in water by treating it with a water solution of an alkaline material, including ammonium, sodium or potassium carbonate. For example, 10 parts of dry casein are added to 56 parts, by weight, of soft water, and the mixture is allowed to stand at ordinary room temperature for 30 to 60 minutes. Then the mixture is stirred and warmed to about 60° C. One part of borax is added to the warm mixture with stirring, and the mixture is stirred for an additional 30 minutes at 60° C. The casein dispersion is allowed to cool. Preferably a fungicide is added to the casein dispersion to protect it and the resulting paint from mold, etc.; e. g., 2 to 3 parts of a 20% solution of Dowicide A [2] (and a corresponding reduction of the original water, employed for dispersing the casein, from 56 to 53 or 54 parts) may be added to the cool casein dispersion.

A paint can be prepared in accordance with the following formula:

| Ingredients: | Parts by weight |
| --- | --- |
| Pigment(s) | 20 to 40 |
| Water | 14 to 30 |
| Casein dispersion | 1 to 10 |
| Antifoaming agent | 0.75 to 3 |
| Copolymer latex | 20 to 55 |

A somewhat more detailed formula is:

| Ingredients: | Parts by weight |
| --- | --- |
| Titanium dioxide | 2 to 25 |
| Lithopone | 3 to 12 |
| Silica and silicates | 4 to 12 |
| Color (if desired) | 3 to 12 |
| Water | 14 to 30 |
| Protein—dry (as a dispersion) | 1 to 3 |
| Antifoaming agent | 0.75 to 3 |
| Polymerized oil | 1 to 6 |
| Copolymer latex | 25 to 55 |

[2] Sodium salt of ortho-phenyl phenol.

The ingredients are chosen in the ranges shown in the above formulas, depending upon the specific paint properties desired. The paint can be prepared by mixing the ingredients in a can by means of a conventional paddle stirrer. The water preferably containing about one percent of $Na_4P_2O_7$ or other soluble phosphate as a pigment dispersant, is stirred while the pigments or mixture of pigments are added. The mixture is stirred for several minutes to insure thorough wetting of the pigment. Then the casein dispersion is added and the mixture is stirred until uniform in appearance. An antifoaming agent, such as pine oil, tributyl phosphate or similar oily antifoamer is then added. Additional fungicide, amounting to 1 to 2 parts, may be added at this point to improve the resistance of the paint to fungi attack. Then the copolymer latex is carefully added, with slow stirring, so as to avoid formation of foam, and the paint is slowly stirred for an additional period of 15 to 30 minutes. The mixed paint can then be filtered, if desired, and is ready for use or packaging.

In the following examples freeze stability of dispersion paints containing aqueous polymer dispersions was determined in the following manner: Thirty grams of dispersed pigment and 20 grams of aqueous polymer dispersion were weighed into ¼ pint metal cans. Viscosity of the resulting paint was adjusted by adding water until the paint possessed a viscosity of 6 seconds as measured in a conical brass cup, capacity 90 ml., with a bottom orifice 0.277 inch in diameter. Viscosity according to this test was determined by filling the cup with paint and measuring the time in seconds required for the paint to flow through the cup orifice until the stream of paint broke. The metal cans were covered and placed in a freezing chamber where they were maintained at −30° C. for 16 hours. The cans were then removed from the freezing chamber and the contents allowed to thaw at room temperature. When the contents of the cans had reached room temperature, the contents were observed in order to determine their freeze characteristics. If the contents had coagulated, the paint had failed the test. If the contents had not coagulated, relative freeze characteristics were evaluated by observing viscosity and grain (floc) presence. Increased viscosity and increased amounts of grain indicated decreasing freeze stability. When freeze characteristics had been observed after one freezing and thawing cycle, the cans were again covered and the contents subjected to succeeding identical cycles until the contents coagulated or exhibited poor stability, or had been subjected to a desired number of freezing cycles. Some freeze stability is reflected by a paint which does not coagulate after one cycle.

*Example 1*

The following ingredients and proportions thereof were introduced into a polymerization reactor.

| | Parts by weight |
| --- | --- |
| Butadiene | 37 |
| Styrene | 63 |
| Potassium persulfate | 1.6 |
| Borax ($Na_2B_4O_7 \cdot 10H_2O$) | 1.2 |
| Water | 150 |

The above materials were maintained in the reactor at a temperature of 50° C. for 23 hours. The solids content was 4.1%. One and one half parts by weight of GMR-S was then injected into the reactor and polymerization continued to vacuum. The resulting latex had a solids content of 37.5%. This latex was further stabilized by the addition thereto of 1.2 parts by weight of Nacconol NRSF,[3] 1.0 part by weight of Triton X-100,[4] 1.0 part additional GMR-S and 1.0 part by weight of ammonium oleate, all per 100 parts polymer.

[3] An alkyl benzene sulfonate supplied by National Aniline Division of the Allied Chemical and Dye Corporation.
[4] A water-soluble alkylaryl polyether alcohol supplied by Resinous Products and Chemical Company.

A paint was prepared by mixing the above stabilized latex with an aqueous pigment dispersion according to the detailed discussion above. This paint was subjected to the previously described freeze test and after four of the freezing and thawing cycles the paint was still fluid and smooth.

Example 2

As another illustration of the preparation of polymer latices and paints in accordance with the invention the following ingredients were charged into a polymerization reactor in the proportions indicated. It should be noted that here GMR–S was included in the original polymerization charge and not injected during polymerization.

| | Parts by weight |
|---|---|
| Butadiene | 37 |
| Styrene | 63 |
| Potassium persulfate | 1.6 |
| Borax | 1.2 |
| GMR–S | 1.0 |
| Water | 150 |

Polymerization was effected at 65° C. Complete conversion resulted at the end of 43 hours. The resulting polymer latex had an excellent rub stability. The latex was further stabilized after polymerization by adding 1.2 parts by weight of Nacconol NRSF, 1.0 part by weight of Triton X–100, 1.0 part by weight of GMR–S and 1.0 part by weight of ammonium oleate, all parts per 100 parts of polymer.

A paint was prepared by mixing the stabilized latex with an aqueous pigment dispersion according to the preceding description. The freeze characteristics of the resulting pain were determined. It was found that after five rigorous freezing and thawing cycles the paint was quite mobile without agitation, very fluid and contained only a very small amount of grain.

Example 3

As a still further illustration of the invention, another charge of ingredients in accordance with the formula used in Example 2 was polymerized at a slightly higher temperature, i. e., 70° C. Complete conversion was effected at the end of 23.5 hours. The resulting latex had excellent rub stability. Six samples of the latex were further stabilized after polymerization by slightly different emulsifier mixtures. One of the samples (Sample A) was stabilized by adding thereto 1 part by weight each of Triton X–100 and ammonium oleate and 1.2 parts Nacconol NRSF, all per 100 parts polymer. Another sample (Sample B) was stabilized by addition thereto of a mixture of emulsifiers consisting of two parts by weight of GMR–S and, additionally, the same proportions of the same emulsifiers added to Sample A. Paints prepared from Samples A and B had excellent freeze characteristics—they were both mobile without agitation, very fluid and contained no grain after the fourth freezing and thawing cycle.

Another sample of the latex (Sample C) was additionally stabilized by adding the following mixture of emulsifiers: 2 parts GMR–S, 1 part Triton X–100 and 1 part ammonium oleate, all by weight per 100 parts polymer. A paint prepared from this sample and subjected to the four cycles of the freeze test displayed excellent freeze characteristics.

Another sample of the latex (Sample D) was further stabilized by adding thereto 2 parts GMR–S and 1 part Triton X–100, both by weight per 100 parts polymer. A paint prepared from this sample had excellent freeze characteristics when subjected to the four cycles of the freeze test.

Another sample of the latex (Sample E) was additionally stabilized after polymerization by adding thereto 2 parts by weight GMR–S per 100 parts polymer. A paint prepared from Sample E was moderately fluid and contained a very slight amount of grain after the first freezing and thawing cycle and was slightly viscous and contained only a very slight amount of grain after the fourth freezing and thawing cycle. No additional stabilizer was added to the sixth sample of latex (Sample F). A paint prepared from this sample was moderately viscous and contained heavy grain after the first freezing cycle. Although this paint did not possess the most desirable freeze characteristics, it nevertheless was freeze stable to some extent since it did not coagulate after one freezing and thawing cycle.

Example 4

The following ingredients and indicated amounts thereof were charged into a polymerization reactor.

| | Parts by weight |
|---|---|
| Butadiene | 37 |
| Styrene | 63 |
| Potassium persulfate | 1.6 |
| GMR–S | 2.0 |
| Borax | 1.2 |
| Water | 150 |

Polymerization was effected at 70° C. and was complete after 21.5 hours. After polymerization, the latex was additionally stabilized by adding the indicated parts by weight of the following emulsifying agents per 100 parts polymer: 1.2 Nacconol NRSF, 1 part Triton X–100 and 1 part ammonium oleate. The latex had excellent rub stability. A paint prepared from this stable latex possessed excellent freeze characteristics after four complete freezing and thawing cycles.

Example 5

For further illustration of the invention the following ingredients and proportions thereof were charged into a polymerization reactor.

| | Parts by weight |
|---|---|
| Butadiene | 37 |
| Styrene | 63 |
| Potassium persulfate | 1.6 |
| GMR–S | 3.0 |
| Borax | 1.2 |
| Water | 150 |

Polymerization also was carried out at 70° C. and was completed after 21.5 hours. The rub stability of the latex was excellent. This latex was divided into several samples (A, B, C and D) for studying the effect on freeze-stability of adding after polymerization varying stabilization recipes. To one of the samples (Sample A) 1.2 parts by weight of Nacconol, 1.0 part by weight Triton X–100 and 1.0 part by weight ammonium oleate, all per 100 parts polymer, were added. A paint was prepared from this sample. After four complete cycles of the freeze test this paint was mobile without agitation and contained no grain. Sample B was further stabilized by adding thereto 1 part by weight of Triton X–100 and 1 part by weight ammonium oleate, both per 100 parts polymer. A paint prepared from this sample was moderately fluid and contained a trace of grain after the fourth freezing and thawing cycle. Sample C was additionally stabilized by adding thereto only 1 part by weight of Triton X–100 per 100 parts polymer. A paint prepared from this sample was moderately fluid and contained somewhat more grain after the first freezing cycle and was moderately viscous and contained a heavy grain after the third freezing and thawing cycle. No additional stabilizer was added to Sample D. A paint produced from this last sample was moderately viscous and contained heavy grain after one freezing cycle. Here too, it is seen that paints produced from polymer latices polymerized in the presence of GMR–S are somewhat freeze-stable without any additional stabilization. However, it is desirable to additionally stabilize the latices somewhere at or after 50% polymerization conversion.

Example 6

Another polymerization recipe, differing only from the recipe of Example 2 in containing 125 parts by weight instead of 150 parts by weight of water, was polymerized at 70° C. Polymerization was completed after 26.5 hours. The resulting latex was further stabilized after polymerization by adding thereto 1.2 parts by weight of Nacconol NRSF, 1.0 part by weight of Triton X–100, 2.0 parts by weight of GMR–S and 1.0 part by weight of ammonium oleate, all per 100 parts polymer. A paint prepared from this latex had excellent freeze characteristics after four complete freezing cycles.

Example 7

Another polymerization recipe, differing only from that of Example 6 in containing initially 2.0, rather than 1.0, parts by weight GMR–S, was also polymerized at 70° C. Polymerization was completed at the end of 21.5 hours. The resulting latex was further stabilized after polymerization by adding thereto 1.2 parts by weight of Nacconol NRSF, 1.0 part Triton X–100 and 1.0 part ammonium oleate, all per 100 parts polymer. A paint prepared from the resulting latex possessed excellent freeze characteristics after four complete freezing cycles.

Example 8

Another polymerization recipe, differing from Examples 6 and 7 only in the amount of initial GMR–S (it contained 3.0 parts by weight) was also polymerized at 70° C. Eighty-six percent conversion resulted after 27.5 hours. The same additional stabilization recipe used in Example 7 was added to this latex after polymerization. A paint prepared from this latex was not quite as freeze stable as the paints of Examples 6 and 7, i. e., the paint was slightly viscous and contained slight grain after the fourth freezing cycle.

Example 9

The following ingredients and proportions thereof were charged into a polymerization reactor:

| | Parts by weight |
|---|---|
| Butadiene | 37 |
| Styrene | 63 |
| Potassium persulfate | 1.6 |
| GMR–S | 0.5 |
| Borax | 1.2 |
| Water | 110 |

Polymerization of this recipe was carried out at 70° C. Two and five tenths parts by weight of GMR–S and 1.0 part by weight Triton X–100 were added to the resulting latex after polymerization. A paint was prepared from the stabilized latex and subjected to the freeze test. After the first cycle the paint was very fluid and contained no grain; after the fourth cycle the paint was moderately fluid and contained a trace grain.

Example 10

Ingredients and proportions thereof identical with the polymerization recipe of Example 9 were charged into a polymerization reactor. Polymerization here was also conducted at 70° C. At 38% polymerization conversion, 0.5 additional part by weight of GMR–S was injected into the reactor and polymerization was continued to completion. The resulting latex was additionally stabilized after polymerization by adding 2.0 parts by weight GMR–S and 1.0 part by weight Triton X–100, both per 100 parts polymer. A paint was prepared from the stable latex and subjected to the freeze test. After one freeze cycle the paint was mobile without agitation, very fluid and contained no grain. After four freezing cycles the paint was slightly viscous and contained very slight grain.

Example 11

Another charge of materials according to the recipes used in Examples 9 and 10 was also polymerized at 70° C. In this instance two additional portions of GMR–S were injected into the reactor during polymerization—0.5 part at 38% conversion and 0.5 part at 60% conversion. After complete conversion, the latex was further stabilized by adding thereto 1.5 parts by weight GMR–S and 1 part by weight of Triton X–100, both per 100 parts polymer. A paint was produced from the stable latex and subjected to the freeze test. After the first freeze cycle the paint was moderately viscous and contained slight grain. After the second freeze cycle the paint was viscous and contained heavy grain.

Example 12

Another polymerization recipe identical with those of Examples 9, 10 and 11 was also polymerized at 70° C. At 38% conversion 1.0 part by weight of GMR–S was injected into the reactor. Polymerization was 77% complete in 27 hours. The rub stability of the resulting latex was excellent. The additional stabilization of this latex after polymerization was identical with that used in Example 11. A paint was prepared from the latex and subjected to the freeze test. After the first freeze cycle the paint was viscous and contained slight grain. After the second freeze cycle the paint was viscous and contained heavy grain.

Example 13

Another recipe identical with that used in Example 12 was polymerized at 70° C. At 38% conversion 0.5 part of GMR–S was injected into the reactor. At 60% conversion 0.5 part Triton X–100 was injected into the reactor. Polymerization was completed. The resulting latex had excellent rub stability. The latex was additionally stabilized after polymerization by adding thereto 2.0 additional parts by weight of GMR–S and 0.5 additional part by weight of Triton X–100, both per 100 parts polymer. A paint was prepared from the latex and subjected to the freeze test. After one freezing cycle the paint was slightly viscous and contained no grain. After four freezing cycles the paint was slightly viscous and contained a very small amount of grain.

Example 14

The following ingredients were charged into a polymerization reactor in the amounts indicated.

| | Parts by weight |
|---|---|
| Butadiene | 37 |
| Styrene | 63 |
| Potassium persulfate | 0.75 |
| GMR–S | 0.5 |
| Borax | 0.8 |
| Water | 110 |

Polymerization of these ingredients was carried out at 70° C. After 18 hours, polymerization was 94% complete. The resulting latex was somewhat unstable. The latex was further stabilized after polymerization by adding thereto 2.5 parts by weight of GMR–S and 1.0 part by weight of Triton X–100, both per 100 parts polymer. A paint was prepared from the stabilized latex and subjected to the freeze test. After the first freeze cycle the paint was slightly viscous and contained slight grain. After two freezing cycles the paint was viscous and contained a moderate amount of grain. The paint coagulated on the fourth freezing cycle.

Example 15

The following ingredients in the amounts indicated were charged into a polymerization reactor.

| | Parts by weight |
|---|---|
| Butadiene | 37 |
| Styrene | 63 |
| Potassium persulfate | 0.5 |
| GMR–S | 1.0 |
| Borax | 0.75 |
| Sulfole B–8 [1] | 0.1 |
| Water | 150 |

[1] A mixture of tertiary aliphatic mercaptans supplied by Phillips Petroleum Company.

The above ingredients were polymerized at 70° C. and polymerization was 86% complete after 28 hours. The resulting latex was relatively unstable. The latex was stabilized after polymerization by adding the following mixture of emulsifiers thereto: 1.2 parts by weight of Nacconol NRSF, 1.0 part by weight of Triton X–100, 1.0 part by weight of GMR–S and 1.0 part by weight of ammonium oleate. A paint containing this latex was slightly viscous and contained a moderate amount of grain after the first freezing cycle. The paint coagulated on the second freezing cycle.

Example 16

The polymerization recipe used in Example 15 was varied only in the following respects: 1.0 part by weight potassium persulfate was used in lieu of 0.5 part and 1.5 parts by weight of borax were used in lieu of 0.75 part. Polymerization of this recipe was carried out at 70° C. and was 98% complete after 20 hours. The rub stability of the resulting latex was excellent. This latex was further stabilized after polymerization in the same manner as the latex of Example 15. A paint was prepared from the stable latex and subjected to the freeze test. After the first freezing cycle the paint was very fluid and contained no grain. After the third freezing cycle the paint was moderately viscous and contained heavy grain.

Example 17

Another recipe varying only from the recipe of Example 16 in the amounts of persulfate and borax was charged into a reactor. In this instance, 1.5 parts by weight persulfate and 2.2 parts by weight of borax were used. Polymerization was also effected at 70° C. and was 100% complete after 20 hours. The resulting polymer latex had excellent rub stability. The latex was additionally stabilized after polymerization by the same mixture of emulsifiers used in Examples 15 and 16. A paint was prepared from the latex and subjected to the freeze test. After five freezing cycles the paint was still very fluid and contained only a trace of grain.

Example 18

Another recipe differing from the recipe of Example 17 only in the amount of borax was charged into a reactor. In this instance 1.2 parts by weight of borax was used. Polymerization was carried out at 70° C. and was 100% after 20 hours. The resulting latex had excellent rub stability. This latex was also further stabilized by the same mixture of emulsifiers used in Examples 15–17. A paint was prepared from the stable latex and subjected to the freeze test. After five freeze cycles the paint was still fluid and contained only a trace of grain.

Example 19

The following ingredients were charged into a polymerization reactor.

| | Parts by weight |
|---|---|
| Butadiene | 37 |
| Styrene | 63 |
| Potassium persulfate | 1.0 |
| GMR–S | 2.0 |
| Borax | 1.4 |
| Sulfole B–8 | 0.1 |
| Water | 100 |

Polymerization was effected at 70° C. At about 70% conversion 2.2 parts by weight of Nacconol NRSF was injected into the reactor. Polymerization was then completed. The resulting latex was further stabilized by adding thereto 5.0 parts by weight of morpholine Dresinate per 100 parts by weight of polymer. A paint was prepared from this stabilized latex and subjected to the freeze test. After the first freeze cycle the paint was slightly viscous and contained no grain. After four cycles the paint was moderately viscous and contained no grain.

The above examples are of an illustrative rather than of a limitative nature. The desirable results of the invention are not dependent upon the type or proportion of monomers used in preparing the polymer latices. The results of the invention are not dependent upon the temperature of polymerizing; ordinarily, however, polymerizing temperatures will be within the general range of 40 to 130° C. The results of the invention are not particularly dependent upon the proportion of water included in the reaction mixture; ordinarily, however, the proportion of water in the reaction mixture will be in the range of 90 to 150 parts by weight per 100 parts by weight of monomer. Although polymerization need not be, it will ordinarily be carried to completion. The total solids contents of the polymer latices fall generally within the range of 35 to 50% by weight. The experiments upon which the above examples are based, along with many additional experiments enable characterization of the invention as follows.

As previously pointed out, in order to obtain a synthetic polymer latex from which a latex paint having some stability under freezing conditions can be produced, it is essential that the latex results from polymerization in the presence of at least about 0.5 part by weight of an alkali metal salt of persulfuric acid per 100 parts by weight of monomer. Much greater resistance to freezing conditions is obtained; however, if polymerization is effected in the presence of at least about 1.0 part by weight of such a persulfate per 100 parts by weight of monomer.

Including soap-modified glyceryl monoricinoleate in the polymerization formula renders a paint produced from the resulting polymer latex somewhat freeze-stable without additionally stabilizing the latex. This fact is illustrated by Examples 3F and 5D. Much more freeze-stable paints, however, result if the polymer latex is additionally stabilized after 50% polymerization conversion and prior to mixing the latex with a pigment dispersion by adding thereto anionic emulsifiers, nonionic emulsifiers or mixtures of anionic and nonionic emulsifiers. Additional stabilization of the polymer latices at or after 50% polymerization conversion is, therefore, a part of the preferred practice of the invention. For some reason, which is not understood, it is desirable that mixtures of one or both of the foregoing types of emulsifiers are used in the additional stabilization recipe.

The preceding discussion has been primarily directed to discussing the freeze-resistant properties of emulsion paints containing polymer latices prepared in accordance with the outlined requirements. It should be here mentioned that not only are these paints freeze-resistant but also the polymer latices themselves are freeze-resistant to coagulation when frozen and thawed after additional stabilization. The invention, therefore, involves not only a paint and the method of making same but also a novel polymer latex and the method of making same.

Certain variations in conditions and proportions of ingredients can be made without departing from the spirit and scope of the invention.

We claim:

1. A method of producing a synthetic polymer latex adapted to withstand freezing and thawing without coagulating, comprising polymerizing a polymerizable ethylenic compound in an aqueous medium in the presence of about 0.5 to about 5.0 parts by weight per 100 parts monomer of modified glyceryl monoricinoleate as an emulsifying agent and in the presence of at least 0.5 part by weight per 100 parts monomer of a water soluble salt of persulfuric acid as a polymerization catalyst, said modified glyceryl monoricinoleate being prepared by reacting one mole of glycerol with one mole of ricinoleic acid in the presence of sufficient potassium hydroxide to provide intrinsically in the glyceryl monoricinoleate product about 3 to about 8% potassium ricinoleate based on the weight of said product whereby the modified glyceryl monoricinoleate is water dispersible.

2. A synthetic latex resistant to coagulation under freezing and thawing conditions which is produced by the method of claim 1.

3. A freeze-stable water emulsion paint which comprises a mixture of water-dispersed paint pigment and a synthetic polymer latex produced in accordance with claim 1.

4. A method of producing a synthetic polymer latex adapted to withstand freezing and thawing without coagulating, comprising the steps of polymerizing a polymerizable ethylenic compound in aqueous medium in the presence of about 0.5 to about 5.0 parts by weight per 100 parts monomer of a modified glyceryl monoricinoleate as an emulsifying agent and at least 0.5 part by weight per 100 parts monomer of a water soluble salt of persulfuric acid as a polymerization catalyst and additionally stabilizing the resulting polymer latex by adding thereto after about 50% polymerization conversion emulsifiers selected from the group consisting of anionic emulsifiers, nonionic emulsifiers and mixtures of anionic and nonionic emulsifiers, said modified glyceryl monoricinoleate being prepared by reacting one mole of glycerol with one mole of ricinoleic acid in the presence of sufficient potassium hydroxide to provide intrinsically in the glyceryl monoricinoleate product about 3 to about 8% potassium ricinoleate based on the weight of said product whereby the modified glyceryl monoricinoleate is water dispersible.

5. A freeze-stable synthetic polymer latex produced in accordance with claim 4.

6. A freeze-stable water emulsion paint comprising a mixture of water-dispersed paint pigment and a synthetic polymer latex produced in accordance with claim 4.

References Cited in the file of this patent

UNITED STATES PATENTS

| | | |
|---|---|---|
| 2,386,764 | Zwicker | Oct. 16, 1945 |
| 2,404,781 | Arnold et al. | July 30, 1946 |
| 2,498,712 | Ryden | Feb. 28, 1950 |
| 2,511,811 | Baer | July 13, 1950 |
| 2,562,944 | Portser | Aug. 7, 1951 |
| 2,605,242 | Betts et al. | July 29, 1952 |
| 2,628,205 | Shoemaker | Feb. 10, 1953 |

OTHER REFERENCES

"Chemicals by Glyco," November 1944 edition, Glyco Products Co., Brooklyn, N. Y., pages 13, 22 and 31.

Parker: "Official Digest," October 1952, pp. 700–709.

Goldsmith: "Polyhydric Alcohol Esters of Fatty Acids," Chem. Reviews, vol. 33, No. 3, December 1943.